Nov. 16, 1948.    E. D. BACON    2,454,026
SYNCHRONOUS ELECTRIC MOTOR
Filed Oct. 30, 1946    3 Sheets-Sheet 1
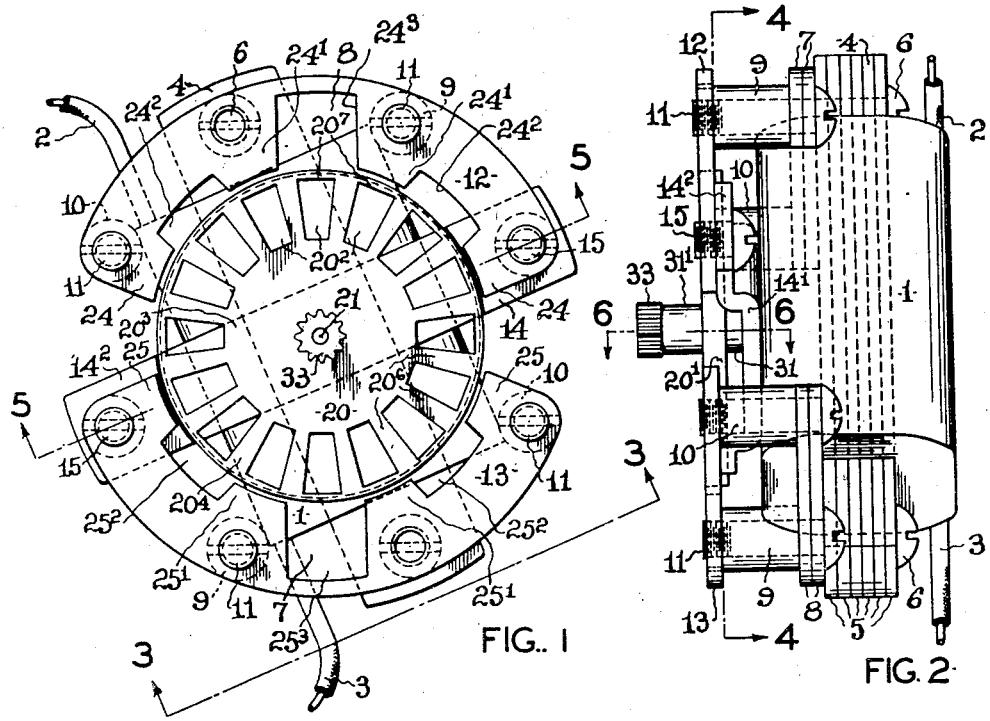
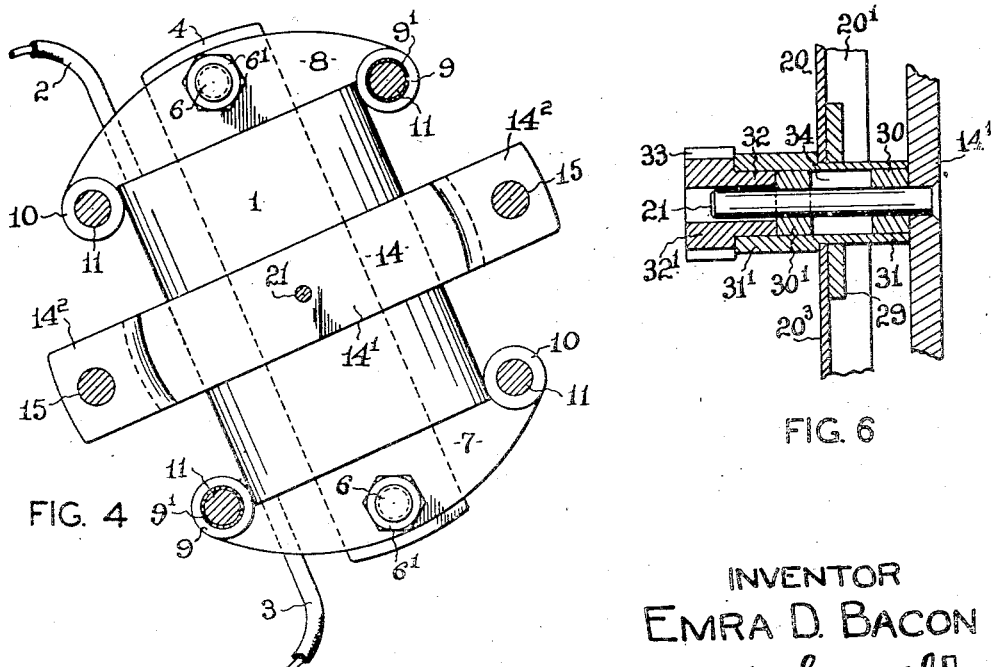
INVENTOR
EMRA D. BACON
BY George W. Saywell
ATTORNEY.

Nov. 16, 1948.  E. D. BACON  2,454,026
SYNCHRONOUS ELECTRIC MOTOR
Filed Oct. 30, 1946  3 Sheets-Sheet 2
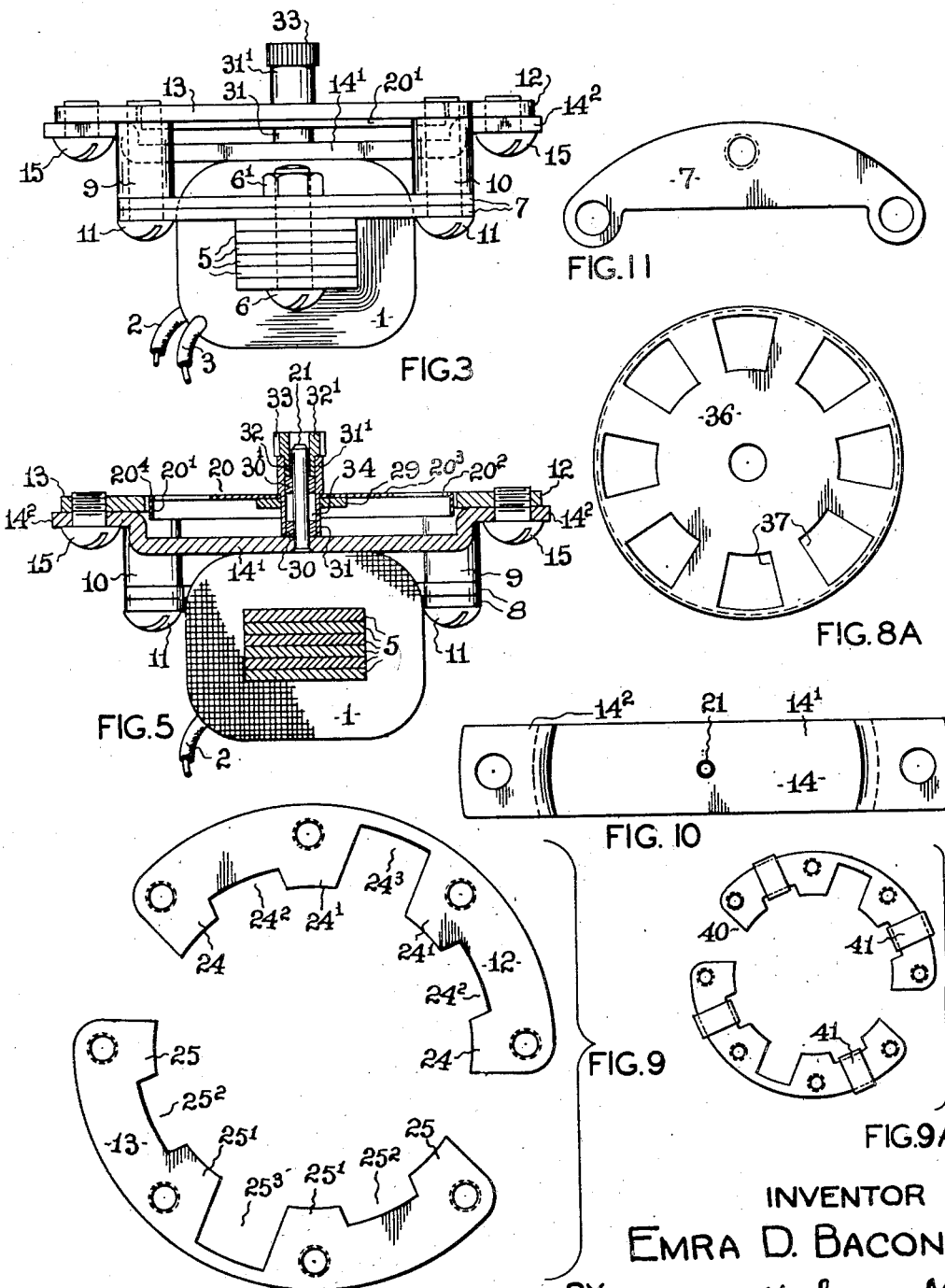
INVENTOR
EMRA D. BACON
BY George W. Saywell
ATTORNEY.

Nov. 16, 1948.  E. D. BACON  2,454,026
SYNCHRONOUS ELECTRIC MOTOR
Filed Oct. 30, 1946  3 Sheets-Sheet 3

INVENTOR
EMRA D. BACON
BY George W. Saywell
ATTORNEY.

Patented Nov. 16, 1948

2,454,026

UNITED STATES PATENT OFFICE 2,454,026

SYNCHRONOUS ELECTRIC MOTOR

Emra D. Bacon, Cleveland, Ohio

Application October 30, 1946, Serial No. 706,740

15 Claims. (Cl. 172—278)

The invention relates to synchronous electric motors, and the objects of the improvements therein are:

A low-cost self-starting motor of simple construction involving in its production a minimum of material waste and having simple shading and a simple energizing coil;

A structure having special laminations permitting more than four pole effects by the stator, with equal magnetic flux on the several poles;

A structure having special laminations in pairs separated by certain spacers from the regular stator poles, which special laminations produce self-starting and direction of rotation of the rotor;

The use of a minimum amount of copper;

An equal distribution of magnetic flux to the stator in great strength;

The non-necessity of close tolerances between relatively moving parts;

A smooth-edge all-steel rotor of one stamping;

A structure in which a minimum of heat is generated;

The provision of a sealed-in oil reservoir for the rotor;

A structure exerting no magnetic end pull on the rotor which floats in the magnetic flux of the stator, thus permitting the use of the all-steel stamping as a rotor;

A balancing of the starting torque and the synchronous torque so as to insure synchronous rotation of the rotor under adverse conditions and normal changes in the line voltage.

The annexed drawings and the following description set forth in detail certain means illustrating the invention in synchronous electric motors, said drawings and description setting forth, however, only one of the various assemblies in which the principle of the invention may be embodied.

In said annexed drawings:

Figure 1 is an elevation, upon an enlarged scale, of the rotor side of the improved synchronous motor;

Figure 2 is a view of the right side of the motor as shown in Figure 1;

Figure 3 is a bottom view of the improved motor, taken from the plane indicated by the line 3—3, Figure 1;

Figure 4 is a section taken in the plane indicated by the line 4—4, Figure 2;

Figure 5 is a section taken axially of the rotor in the plane indicated by the line 5—5, Figure 1;

Figure 6 is a fragmentary and further enlarged section taken axially of the rotor in the plane indicated by the line 6—6, Figure 2;

Figure 7:
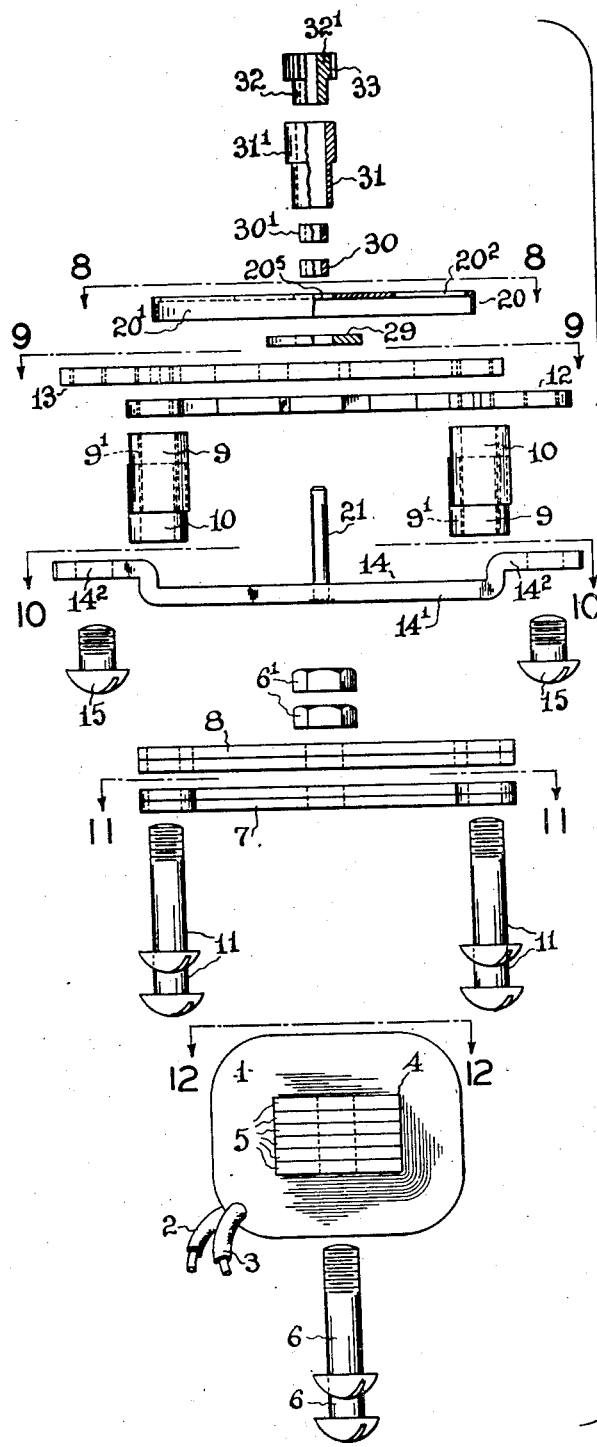
Figure 7 is an exploded view of the improved motor showing from top to bottom the successive parts thereof commencing with the drive pinion secured to the rotor on one side to the coil and laminated core bars mounted therein on the other side.
Figure 8:
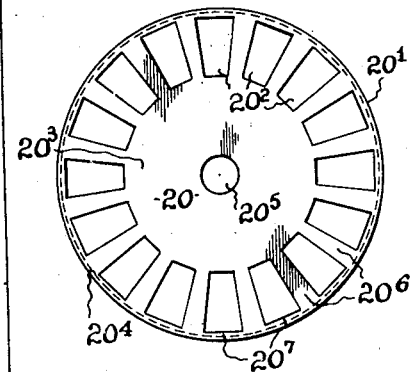
Figure 12:
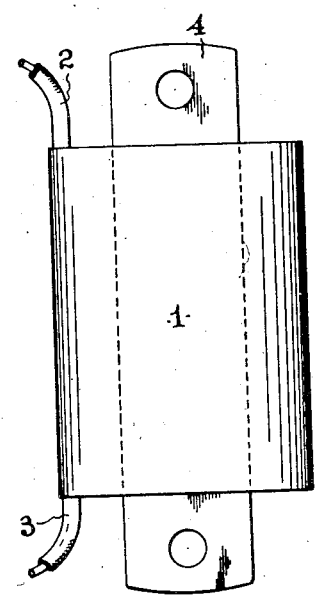

Figure 8 is a face view of a permanent magnet all-steel smooth-edged one-piece rotor stamping suitable for use with the divided-ring stator shown in Figure 9, the one-piece rotor stamping being formed with a comparatively large number of concentric peripheral openings, preferably having walls lying in radial planes, these openings providing alternate pole portions, the openings extending to the periphery of a circle closely adjacent but somewhat spaced from the peripheral rim of the rotor, thus providing spaced hysteresis portions at the outer edge of the rotor, this Figure 8 being taken from the plane indicated by the line 8—8, Figure 7;

Figure 8—A is a similar view of a modified form of rotor structure also suitable for use with the divided-ring stator structure shown in Figure 9;

Figure 9 is a view of the divided stator ring, taken from the plane indicated by the line 9—9, Figure 7;

Figure 9—A is a similar view of a modified form of stator structure;

Figure 10 is a view of a non-magnetic connection between diametrically opposed ends of the two stator poles, taken from the plane indicated by the line 10—10, Figure 7;

Figure 11 is a view of one of the two-part special lamination structures, taken from the plane indicated by the line 11—11, Figure 7; and Figure 12 is a view of the coil and its laminated core, taken from the plane indicated by the line 12—12, Figure 7;

Referring to the annexed drawings in which the same parts are indicated by the same respective numbers in the several views, the embodiment of the improved synchronous motor herein shown and described comprises an energizing coil 1, Figure 12, provided with insulated leads 2 and 3 which emerge from respective corners at the two ends of the coil 1 for connection to a source of alternating current. A core 4 of non-permanent magnet iron or steel consisting of a plurality of laminations 5 extends through the coil 1 and is secured adjacent its respective ends by steel bolt 6 and nuts 6$^1$, Figures 3 and 7, to and centrally of special arcuate laminations 7 and 8, Figures 7 and 11, having the axis of a rotor 20, Figure 8, as a center, which special laminations 7 and 8 are substantially quadrants and each of which in the form shown consists of two superimposed pieces, these special laminations 7 and 8 being formed of non-permanent magnet iron or steel. Spaced from the special laminations 7 and 8, and also having the axis of the rotor 20 as a center, is a stator or field member, Figure 9, which is a flat ring of non-permanent magnet iron or steel broken in diametrically opposite portions into two pole pieces 12 and 13, Figures 1, 3, 5, 7, and 9, which pole pieces 12 and 13 have their diametrically opposed ends, i. e., one end of each of the pole pieces 12 and 13, connected to the respective ends 14² of a diametrical non-magnetic strip 14, Figures 1, 5, 7, and 10, by screws 15, this connecting strip 14 being relatively right-angular to the axis of the coil 1. The stator ring may, if desired, be broken in more than two places. The connecting strip 14 is formed of brass, copper, aluminum, plastic, or other suitable material and is of angular formation having the two offset end portions 14² and a main central portion 14¹ which provides bearing space for the rotor 20 and which rests upon the inner face of the coil 1.

The spacing of the special laminations 7 and 8 from the stator pole pieces 12 and 13 is effected by four elements, two of which, one for each special laminated structure, are iron elements 10, and two of which, one for each special laminated structure, are copper elements 9 having iron cores 9¹, Figures 2 and 7, the elements 9 and 10 being formed from tubular stock. The iron-cored copper elements 9 provide shading. Bolts 11, Figures 4 and 7, pass through the tubular spacers 9 and 10 and secure the special laminations 7 and 8 to and spaced from the pole pieces 12 and 13. The special laminations 7 and 8 are of materially less angular extent than the pole pieces 12 and 13, being secured to the latter at one end adjacent the respective ends of the pole pieces 12 and 13, the overlap portions of the latter being at their respectively diametrically opposed ends.

The pole pieces 12 and 13 are each formed in their inner peripheral edge portions, Figure 9, with end cuts or slots 24² and 25², respectively, and central cuts or slots 24³ and 25³, respectively, the inwardly-extended end projections 24 and 25, respectively, and intermediate projections 24¹ and 25¹, respectively, thus defined serving as eight poles. The slots 24²—25², respectively, are of materially less depth than the respective slots 24³—25³, in the form of divided stator ring shown.

Mounted in the main central portion 14¹ of the non-magnetic connecting strip 14, Figures 5, 6, and 7, is one end of a stationary steel pin 21 upon which is rotatably mounted the rotor 20, Figures 1, 5, 7, and 8, a one-piece stamping of permanent magnet steel, having a peripheral flange 20¹, Figure 6, providing a smooth-edged rotor member within the stator, Figure 5, and concentric with the stator projections 24—24¹ and 25—25¹ and lying closely adjacent the latter. The rotor 20 is formed with a comparatively large number of spaced outwardly-extended openings 20², Figures 1 and 8, whose spaced outer edge portions lie in a circle spaced from but closely adjacent the rim 20⁴, thus forming spaced pole areas 20⁶ projected from a central unbroken circular rotor portion 20³ outwardly to the peripheral rim 20⁴ and an equal number of alternate hysteresis portions 20⁷ adjacent the rim 20⁴. The central portion 20³ of the rotor is formed with an opening 20⁵ for the reception of a bearing housing 31, Figures 5, 6, and 7, pressed thereinto and having an enlarged portion 31¹ at one end forming a shoulder which abuts the inner face of the rotor 20. Within the outer end of the bearing housing 31 is a graphite bronze bearing 30 and within the outer end of the bearing housing portion 31¹ is a graphite bronze bearing 30¹. These are bearings for the rotor journal pin 21, are pressed into the housing 31 and housing part 31¹, and define a sealed oil pocket 34. A washer 29 surrounds the housing 31 adjacent the outer face of the central portion 20³ of the rotor 20. A hub member 32 is pressed into the inner end of the housing portion 31¹, abuts the inner bearing 30¹, surrounds the inner end of the pin 21, and has an inwardly-extended enlarged portion 32¹ extended beyond the inner end of the pin 21 and having its outer peripheral portion formed into a pinion 33 serving as a drive member for clockworks or other mechanism driven by the motor.

The special laminations 7 and 8 which are between the core laminations 5 and the stator 12—13 distribute the magnetic flux to several points on the stator, and what is particularly important in this type of motor distribute the magnetic flux equally at all points on the stator. These special laminations 7 and 8 provide for more than four stator poles, eight in the form of assembly shown, with equal distribution of the magnetic flux to all poles.

The multiple openings 20² of the rotor 20 are so arranged as to conform with the poles of the stator, and effect synchronism with the frequency of the generator supplying the current. For instance, the sixteen openings 20² shown in Figure 8 provide synchronism for 450 R. P. M., one polar area 20⁶ entering radial alignment with a stator projection before the preceding polar area 20⁶ has passed beyond radial alignment with the same polar projection, whereas the eight openings 37 shown in the modified form of rotor 36 of Figure 3—A provide synchronism for 900 R. P. M., the number of openings 37 corresponding with the number of poles on the stator ring. Four rotor openings would provide synchronism for 1800 R. P. M. and two rotor openings, synchronism for 3600 R. P. M. Providing the side walls of these openings 20² in radial planes is of considerable assistance if the openings are made by milling operations. There is no magnetic end pull on the rotor 20 which floats in the magnetic flux of the stator. This condition permits the use of an all-steel stamping as a rotor. The provision of a smooth-edged rotor surrounded by the stator structure, in the assembly shown, eliminates rotor lugs or projections.

There is no necessity of providing the hub member 32 with an oil hole since the oil pocket 34 is sealed, the bearings 30 and 30¹ being originally soaked in oil so that there is no necessity for oiling thereafter, the bearing housing 31 being pressed into the rotor 20 and the pinion hub 32 being pressed into the housing member 31¹. Inasmuch as the inner end of the pin 21 merely extends into and through the hub 32, there is no necessity for providing close tolerance of these parts.

The iron-cored copper spacers 9 provide very simple shading and require a minimum amount of copper, and there is no waste in manufacturing since they are made from copper tubing. The improved motor assembly generates a minimum of heat inasmuch as there is no copper between the stator and the rotor nor any copper inside of the stator. The short spacing of the stator from the coil provides a distribution of magnetic flux to the stator in maximum strength. The relative position of the steel and copper spacers determines the direction of movement of the rotor. If a copper spacer is at the right of a steel spacer, the rotor will turn clockwise; contrariwise, if the copper spacer is at the left of the steel spacer.

The special laminations 7 and 8 are energized by the coil 1 and they in turn energize the stator ring at different locations and at a minimum distance from the coil 1. The magnetic flux which passes through the copper spacers 9 causes a time lag at the shaded poles on the stator ring 12—13 which effects rotation of the rotor 20, the pole portions 20⁶ of the rotor 20 passing the poles on stator 12—13 synchronously with the frequency of the current supply. The salient poles 24—24¹ and 25—25¹ extend to a position adjacent to the path of rotor movement, and the portions of the peripheral rim 20⁴ adjacently outwardly of the openings 20² provide hysteresis portions alternating with the pole portions 20⁶ between adjacent openings 20². In the event eight polar projections on each part of the divided stator ring are provided, instead of the four projections on a side shown in Figure 9, the angular extent of the special laminations 7 and 8 would be increased.

Figure 9—A shows a form of divided stator ring 40 in which the shaded tubular spacers 9 are eliminated, and in lieu thereof there are provided four copper bands 41 encircling the respective stator ring parts in the end slot areas. With this construction, four iron spacers, similar to the spacers 10 would be utilized.

The connecting strip 14 serves as a support for the rotor journal pin 21 and provides a broad base which serves in lieu of a rotor case. This connecting strip 14 is non-magnetic and shading thereby is obviated since it is not disposed completely around the stator. The main central portion 14¹ of the strip 14 provides ample bearing space for the rotor 20.

What I claim is:

1. A self-starting synchronous electric motor having a rotor formed to provide symmetrically-arranged alternate polar areas and hysteresis areas, a divided-ring stator having polar projections concentric with, surrounding and closely adjacent the rim of the rotor, non-magnetic means supported on the stator parts, an energizing coil including a laminated core, auxiliary pole pieces secured to and adjacent the ends of the core, the stator parts being mounted on the auxiliary pole pieces, and diametrically opposed shading means and alternate diametrically opposed non-shading means forming the mounting means and spacing the stator parts from the auxiliary pole pieces.

2. A self-starting synchronous electric motor having a rotor formed to provide symmetrically-arranged alternate polar areas and hysteresis areas, a divided-ring stator having polar projections concentric with, surrounding and closely adjacent the rim of the rotor, non-magnetic means supported on the stator parts and forming a supporting base for the rotor, an energizing coil including a laminated core, auxiliary pole pieces secured to and adjacent the ends of the core, the stator parts being mounted on the auxiliary pole pieces, and diametrically opposed shading means and alternate diametrically opposed non-shading means forming the mounting means and spacing the stator parts from the auxiliary pole pieces.

3. A self-starting synchronous electric motor having an energizing coil including a laminated core, spaced non-permanent magnetic members centrally secured to and adjacent the ends of the core, a shading member mounted on and adjacent an end of each member, a non-shading member mounted on and adjacent the opposite end of each member, a divided-ring stator having its several parts mounted on the respective shading and non-shading members in spaced relation to the first-mentioned members, non-magnetic means diametrically connecting the several stator parts, the stator being formed with spaced polar projections throughout its inner peripheral edge, and a rotor having a smooth peripheral edge and formed with spaced polar areas and mounted within the stator and having its axis concentric with the latter and with the first-mentioned members.

4. A self-starting synchronous electric motor having an energizing coil including a laminated core, a pair of opposed substantially quadrant non-permanent magnetic members centrally secured to and adjacent the ends of the core, each of said members being of laminated construction, a two-part divided-ring stator concentric with the members and bolted to the ends of the respective members in spaced relation thereto, the stator parts in diametrically opposed portions overlapping the respective members, diametrically opposed tubular iron spacers disposed between the members and the stator parts and enclosing one pair of bolts, diametrically opposed tubular copper spacers having inner iron sleeves and enclosing the other pair of bolts, a non-magnetic strip diametrically connecting the stator parts, the stator parts being formed with four spaced inwardly-extended polar projections on each part, a projecting pin mounted at one end in and centrally of the connecting strip, and a rotor mounted on the pin within and having its periphery closely adjacent to the polar projections of the stator ring parts, the rotor being formed with eight radially-extending spaced symmetrically-arranged polar areas forming eight alternate hysteresis areas intermediate the respectively adjacent polar areas.

5. A self-starting synchronous electric motor, as in claim 4, in which the rotor polar and hysteresis areas are formed by eight spaced outwardly-extended openings formed through the rotor.

6. A self-starting synchronous electric motor, as in claim 4, in which the rotor polar and hysteresis areas are each sixteen in number, and each is aligned during the rotation of the rotor with a stator pole before the preceding similar area has passed out of alignment with the same stator pole.

7. A self-starting synchronous electric motor, as in claim 4, in which the rotor polar and hysteresis areas are formed by eight spaced outwardly-extended openings formed through the rotor and in which the openings extend from an unbroken central rotor portion to a circle adjacent to but slightly spaced from the rotor periphery.

8. A self-starting synchronous electric motor, as in claim 4, in which the tubular spacers are all of iron material and the stator parts are shaded intermediate adjacent polar projections thereof.

9. A self-starting synchronous electric motor, as in claim 4, in which the tubular spacers are all of iron material and the stator parts are encircled by copper bands intermediate adjacent polar projections thereof.

10. A rotor for self-starting synchronous electric motors comprising a disc, a bearing housing extended through the disc and having a press-fit therein and centrally thereof, bearings having a press-fit in the housing, a pin secured at one end and journaled in the bearings, and a hub having a press-fit in the housing, the hub exteriorly of the housing having a peripheral portion thereof of pinion formation, the opposite end of the pin extending into the hub.

11. A rotor for self-starting synchronous electric motors, as in claim 10, in which the housing has a reduced end portion having a press-fit in the disc, and a larger portion in which one of the bearings and the hub have a press-fit, and in which the bearings are two in number and are spaced to form a sealed oil reservoir therebetween.

12. A self-starting synchronous electric motor having an energizing coil including a laminated core, a pair of opposed non-permanent magnetic members centrally secured to and adjacent the ends of the core, a multiple-part divided-ring stator concentric with the members and bolted to the members in spaced relation thereto, the stator parts in diametrically opposed portions overlapping the members, diametrically opposed tubular iron spacers disposed between the members and the stator parts and enclosing some of the bolts, diametrically opposed alternate tubular copper spacers having inner iron sleeves and enclosing the other bolts, non-magnetic means diametrically connecting the stator parts, the stator parts being formed with spaced inwardly-extended polar projections, a projecting pin mounted at one end in and centrally of the connecting means, and a rotor mounted on the pin within and having its periphery closely adjacent to the polar projections of the stator ring parts, the rotor being formed with radially-extending spaced symmetrically-arranged polar areas forming alternate hysteresis areas intermediate the respectively adjacent polar areas.

13. A self-starting synchronous electric motor, as in claim 12, in which the rotor polar and hysteresis areas are formed by spaced outwardly-extended openings formed through the rotor, and in which the number of rotor openings is such as to effect synchronism with the frequency of the alternating current source, and in which the number of stator polar projections equals the number of openings.

14. A self-starting synchronous electric motor having a rotor formed to provide symmetrically-arranged alternate polar areas and hysteresis areas, a divided-ring stator having polar projections concentric with, surrounding and closely adjacent the rim of the rotor, non-magnetic means supported on the stator parts, an energizing coil including a laminated core, auxiliary pole pieces secured to and adjacent the ends of the core, and means spacing the stator parts from the auxiliary pole pieces.

15. A motor, as defined in claim 14, in which said auxiliary pole pieces consist of arcuate laminations, and said last-named means comprises tubular spacers.

EMRA D. BACON.

REFERENCES CITED

The following references are of record in the file of this patent:

UNITED STATES PATENTS

| Number | Name | Date |
| --- | --- | --- |
| Re. 19,481 | Toewe | Feb. 26, 1935 |
| 1,942,076 | Warren | Jan. 2, 1934 |
| 2,015,042 | Reinhardt | Sept. 17, 1935 |
| 2,284,395 | Kohlhagen | May 26, 1942 |
| 2,292,265 | Carpenter | Aug. 4, 1942 |